(12) United States Patent
Lu (10) Patent No.: US 9,838,052 B2
(45) Date of Patent: Dec. 5, 2017

(54) INTERFERENCE PROCESSING METHOD AND APPARATUS

(71) Applicant: MONTAGE TECHNOLOGY (SHANGHAI) CO., LTD., Shanghai (CN)

(72) Inventor: Zhen Lu, Shanghai (CN)

(73) Assignee: MONTAGE TECHNOLOGY (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/197,794

(22) Filed: Jun. 30, 2016

(65) Prior Publication Data

US 2017/0077972 A1    Mar. 16, 2017

(30) Foreign Application Priority Data

Sep. 15, 2015 (CN) .......................... 2015 1 0586354

(51) Int. Cl.

| | |
|---|---|
| *H04B 1/10* | (2006.01) |
| *H04B 7/005* | (2006.01) |
| *H04L 27/26* | (2006.01) |
| *H04L 25/03* | (2006.01) |
| *H04L 25/08* | (2006.01) |
| *H04L 25/02* | (2006.01) |

(52) U.S. Cl.

CPC ........... *H04B 1/1027* (2013.01); *H04B 7/005* (2013.01); *H04L 27/2647* (2013.01); *H04L 25/0202* (2013.01); *H04L 25/03292* (2013.01); *H04L 25/085* (2013.01); *H04L 27/2601* (2013.01); *H04L 2025/03414* (2013.01)

(58) Field of Classification Search

CPC ....... H04L 2025/03414; H04L 25/0202; H04L 25/03292; H04L 27/2601; H04L 25/085

See application file for complete search history.

(56) References Cited

U.S. PATENT DOCUMENTS

| | | | | |
|---|---|---|---|---|
| 5,723,995 A | * | 3/1998 | Mozdzen | ................. G06F 1/10 327/141 |
| 2007/0058734 A1 | * | 3/2007 | Kao | .................... H04L 25/0202 375/260 |

* cited by examiner

*Primary Examiner* — Janice Tieu (74) *Attorney, Agent, or Firm* — Jun He Law Offices P.C.; James J. Zhu (57) ABSTRACT

An interference processing method comprises: receiving a multi-carrier modulated signal, wherein the multi-carrier modulated signal comprises multi-carrier modulation symbols; decomposing the multi-carrier modulation symbols into a set of subcarriers, wherein the set of subcarriers at least comprises a target subcarrier; equalizing the target subcarrier to obtain an equalized target subcarrier; obtaining an error power of the equalized target subcarrier; and comparing the error power of the equalized target subcarrier with a predefined threshold to determine the existence of interference in the target subcarrier, wherein the predefined threshold is associated with a minimum distance between two constellation points of a modulation constellation of the target subcarrier.

21 Claims, 8 Drawing Sheets

INTERFERENCE PROCESSING METHOD AND APPARATUS

CROSS REFERENCE TO RELATED APPLICATIONS

This application claims priority to Chinese Patent Application Number 201510586354.3 filed on Sep. 15, 2015, the entire content of which is incorporated herein by reference.

TECHNICAL FIELD

The application generally relates to communication technology, and particularly to an interference processing method and apparatus.

BACKGROUND

In communication systems such as a digital TV broadcast system or a wireless local area network (WLAN) system, interference signals usually appear in signals received by a receiver. The interference signals worsen the signal-to-noise-ratio (SNR) of the received signal at frequencies where the interference signals appear, which severely affects the performance of the receiver. In order to mitigate the negative effect of the interference signals, it is required for the receivers of these systems to have strong anti-interference capability.

A notch filter is generally used in the receivers to combat interference. However, since the bandwidth of the notch filter is preset but the bandwidth of the interference signal is generally unknown, this method cannot remove the interference signal completely. Another method for combating interference is to detect interference for each subcarrier by converting the received signal into a frequency domain using discrete Fourier transform (DFT) or fast Fourier transform (FFT), and notch the subcarrier on which interference is detected. However, there still are some problems for this method. In one hand, false accept rate of this method is high since it is hard to determine the interference detection threshold. In another hand, when a subcarrier is encountered with an interference signal, both the desired signal and the interference signal would be filtered out simultaneously, which adversely affects the desired signal.

With the wide spread of multi-carrier systems in areas of broadcasting and communication, it is required to provide a method for detecting and mitigating interference in a multi-carrier receiver.

SUMMARY

At least one objective of the application is to provide an interference processing method for use with a multi-carrier receiver.

In a first aspect of the application, there is provided an interference processing method. The method includes: receiving a multi-carrier modulated signal, wherein the multi-carrier modulated signal comprises multi-carrier modulation symbols; discomposing the multi-carrier modulation symbols into a set of subcarriers, wherein the set of subcarriers at least comprises a target subcarrier; equalizing the target subcarrier to obtain an equalized target subcarrier; obtaining an error power of the equalized target subcarrier; and comparing the error power of the equalized target subcarrier with a predefined threshold to determine the existence of interference in the target subcarrier, wherein the predefined threshold is associated with a minimum distance between two constellation points of a modulation constellation of the target subcarrier.

In another aspect of the application, there is provided an interference processing apparatus. The apparatus includes: a sub-carrier decomposition module configured to receive a multicarrier modulated signal comprising multicarrier modulation symbols, and to decompose the multicarrier modulation symbols into a set of subcarriers, wherein the set of subcarriers at least comprises a target subcarrier; a subcarrier equalization module configured to equalize the target subcarrier to obtain an equalized target subcarrier; an error power obtaining module configured to obtain an error power of the equalized target subcarrier; and an interference determination module configured to determine the existence of interference in the target subcarrier by comparing the error power of the equalized target subcarrier with a predefined threshold, wherein the predefined threshold is associated with a minimum distance between two constellation points of a modulation constellation of the target subcarrier.

The foregoing has outlined, rather broadly, features of the present application. Additional features of the present application will be described, hereinafter, which form the subject of the claims of the present application. It should be appreciated by those skilled in the art that the conception and specific embodiments disclosed herein may be readily utilized as a basis for modifying or designing other structures or processes for carrying out the objectives of the present application. It should also be realized by those skilled in the art that such equivalent constructions do not depart from the spirit and scope of the present application as set forth in the appended claims.

BRIEF DESCRIPTION OF THE DRAWINGS

The aforementioned features and other features of the present application will be further described in the following paragraphs by referring to the accompanying drawings and the appended claims. It will be understood that, these accompanying drawings merely illustrate certain embodiments in accordance with the present application and should not be considered as limitation to the scope of the present application. Unless otherwise specified, the accompanying drawings need not be proportional, and similar reference characters generally denote similar elements.

DETAILED DESCRIPTION OF THE PREFERRED EMBODIMENTS

The following detailed description refers to the accompanying drawings as a part of the present application. Unless otherwise stated in the context, similar symbols generally represent similar components in the accompanying figures. The illustrative embodiments described in the detailed description, the accompanying drawings and the claims are not limiting, and other embodiments may be adopted, or modifications may be made without deviating from the spirit and subject of the application. It should be understood that, the various aspects of the application described and graphically presented herein may be arranged, replaced, combined, divided and designed in many different configurations, and these different configurations are included in the application implicitly.

Figure 1:
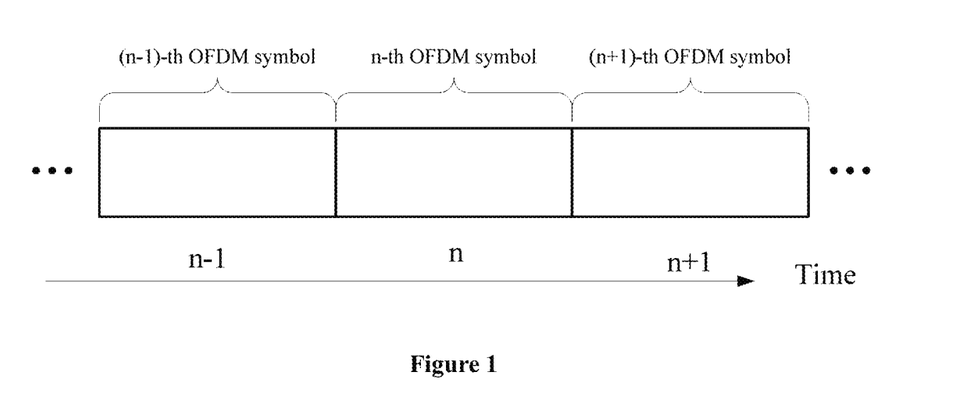
FIG. 1 illustrates an exemplary structure of a multi-carrier modulation signal.

Multicarrier modulation technology is widely used in communication network or devices such a digital TV, a mobile communication, a WLAN, and etc. Compared with single-carrier modulation technology, the multicarrier modulation technology can combat multi-path interference better. The multicarrier modulation technology may be implemented by various technologies, for example, by multicarrier-code division multiple access (MC-CDMA) technology, orthogonal frequency division multiplexing (OFDM) technology, coded multicarrier modulation (MCM) technology, etc. Accordingly, a multicarrier modulated signal used in the multicarrier modulation technology may be an MC-CDMA signal, an OFDM signal or other multicarrier modulation signal. FIG. 1 illustrates an exemplary structure of a multi-carrier modulation signal which is an OFDM signal. The multicarrier modulated signal shown in FIG. 1 includes a plurality of contiguous multicarrier modulation symbols. The labels n−1, n, and n+1 in FIG. 1 denote the order of the OFDM symbols in chronological order. It should be noted that the multicarrier modulation symbols shown in FIG. 1 are exemplary only. Actually, two adjacent multicarrier modulation symbols may either be continuous or discontinuous. For example, two adjacent multicarrier modulation symbols may have certain protection intervals during which no multicarrier modulation symbol is transmitted by the transmitter. In addition, other types of signals, for example, signals other than the multicarrier modulation signal, such as pseudo-random signals or synchronization signals, may be contained between two adjacent multicarrier modulation symbols. The respective lengths of different multicarrier modulation symbols may be either equal or unequal to each other according to different specific communication systems.

In order to mitigate interference in the multicarrier modulated signal, an interference processing method and an interference processing apparatus are provided in this application. According to different applications, the interference processing method and apparatus may be used for detecting interference, or further for suppressing interference.

Figure 2:
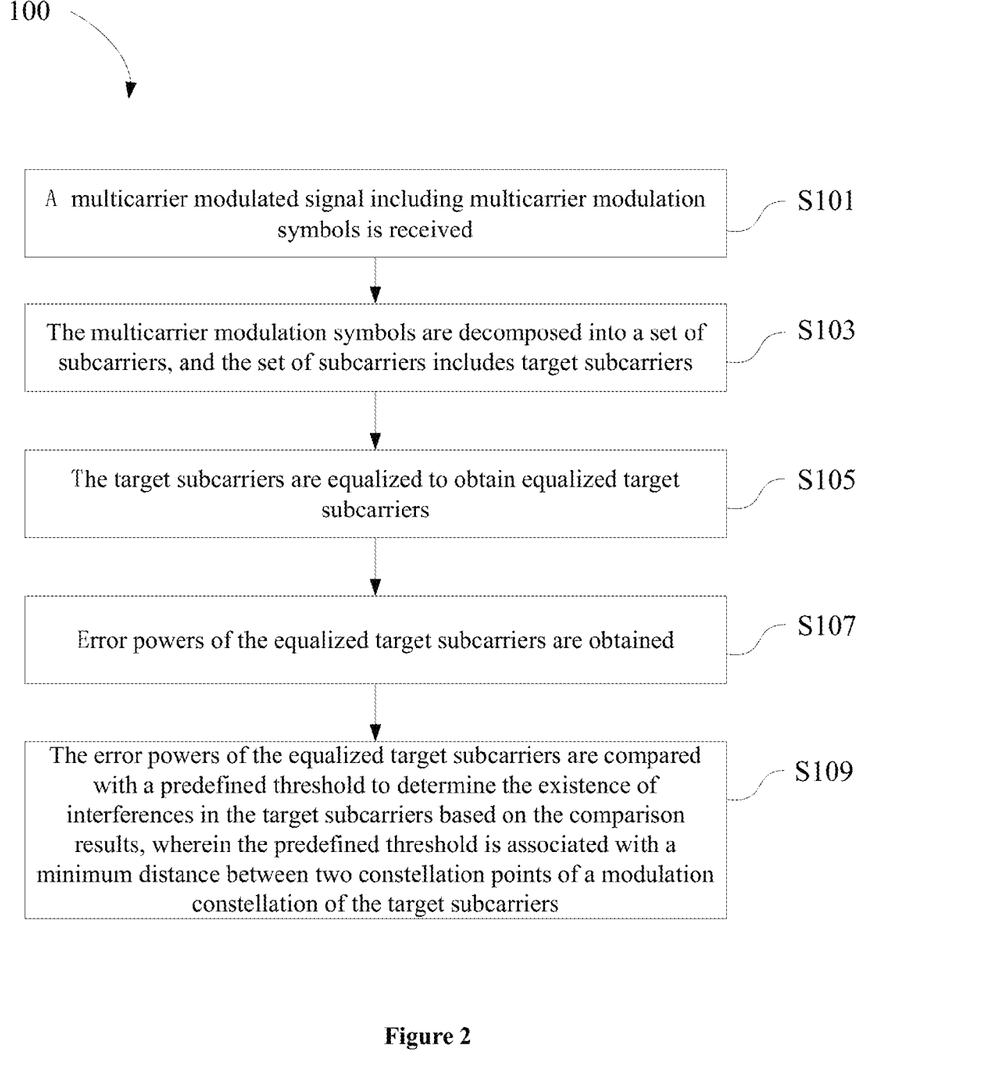
FIG. 2 illustrates an interference processing method 100 according to an embodiment of the application.

FIG. 2 illustrates an interference processing method 100 according to an embodiment of the application. The interference processing method 100 may be used to detect interference in a multicarrier modulated signal. Specifically, the method 100 includes the following steps.

At step S101, a multicarrier modulated signal including multicarrier modulation symbols is received.

In certain embodiments, the multicarrier modulated signal refers to a digital baseband signal outputted by a RF frontend circuit, which may be a signal generated by any multicarrier modulation technologies including, without limitation, an MC-CDMA signal, an OFDM signal, a coded MCM signal and so on. The multicarrier modulated signal is the signal to be detected and processed.

At step S103, the multicarrier modulation symbols are decomposed into a set of subcarriers, and the set of subcarriers include one or more target subcarriers.

In some embodiments, when the multicarrier modulation symbol is an OFDM symbol, a discrete Fourier transform (DFT) or a fast Fourier transform (FFT) may be used to decompose the multicarrier modulation symbols into a set of subcarriers. In some embodiments, for the multicarrier modulation symbols which are constructed by a filter bank, they may alternatively be decomposed into a set of subcarriers using a filter bank. The target subcarriers are the subcarriers to be processed.

Since the multicarrier modulated signal is a wideband signal formed of multiple subcarriers, when it is decomposed into a set of subcarriers, information carried by each of the subcarriers may be processed respectively. In some embodiments, in order to suppress adjacent channel interference and reduce the complexity of filter design, one or more subcarriers near the outside of the bandwidth are generally configured as "null" subcarriers which do not carry data. In other words, no power is transmitted on these null subcarriers. In addition, in order to avoid DC interference, one or more subcarriers at or near the center of the bandwidth or the DC subcarrier may also not be used to carry data. In these cases, the receiver is only desired to decode the subcarriers that carry data. Such subcarriers are the target subcarriers referred herein. It can be well appreciated that, in some embodiments, it may be possible to use all of the set of subcarriers to carry data, and accordingly, all of the subcarriers are target subcarriers referred herein.

In some embodiments, the set of subcarriers of the multicarrier modulation symbols may be partitioned into a plurality of subsets. Data carried by different subsets of subcarriers may be independent from each other. For example, data carried by different subsets of subcarriers may belong to different code blocks, and only one or a portion of the code blocks may be desired to be decoded by the receiver. In this case, only the corresponding subcarriers that carry the code block(s) are desired to be processed by the receiver, and such subcarriers are predetermined by the receiver. Thus, the target subcarriers desired to be processed may be a subset of all the subcarriers of the multicarrier modulation symbols. It can be understood that, in some embodiments, the target subcarriers desired to be processed may alternatively be all of the subcarriers that carry data.

In the following, a k-th target subcarrier obtained by subcarrier decomposition of the multicarrier modulation symbols is denoted as Yk for illustration purpose.

At step S105, the one or more target subcarriers are equalized to obtain one or more equalized target subcarriers.

In some embodiments, direct division method or zero forcing (ZF) method, minimum mean square error (MMSE) method or other suitable equalization methods may be used to equalize the target subcarriers. The direct division method refers to dividing one or more subcarriers by channel response information corresponding to the one or more subcarriers to remove the influence of a channel to obtain the equalized target subcarrier(s). The MMSE method solves the problem based on a criteria that minimizes a mean square error of the equalized target subcarriers.

After the equalization of the k-th target subcarrier, an equalized target subcarrier Xk is obtained.

At step S107, an error power of the one or more equalized target subcarrier is obtained.

The multicarrier modulation symbols may be transmitted in a multicarrier modulated signal successively, and the multicarrier modulation symbols being processed may be some of the multicarrier modulation symbols. It can be appreciated that the error power reflects the degree of interference on these subcarriers. The less interference a target subcarrier encounters, the less the equalized target subcarrier deviates from an ideal value. On the contrary, the stronger interference the target subcarrier encounters, the more the equalized target subcarrier deviates from the ideal value.

It can be appreciated that the interference may be various types of interference introduced into the bandwidth range of the desired signal, such as co-channel interference or adjacent channel interference from an adjacent channel signal which does not attenuate enough within the bandwidth of the desired signal. The interference may also be a harmonic interference generated by the receiver itself, which is introduced into the bandwidth range of the desired signal.

In some embodiments, the error power of an equalized target subcarrier may be calculated with the following steps. First, the equalized target subcarrier is hard decided. Then, the error power of the equalized target subcarrier is determined based on a difference between the equalized target subcarrier and the hard-decided subcarrier. For example, a hard-decision result Sk is obtained when the equalized target subcarrier Xk is hard decided. The difference between the equalized target subcarrier Xk and the hard-decision result Sk is denoted as an error Ek of the equalized target subcarrier, i.e., Ek=Xk−Sk. The error power Pk of the equalized target subcarrier is defined as a squared modulus of the error Ek, i.e., Pk=|Ek|$^2$.

At step S109, the error power of the equalized target subcarriers is compared with a predefined threshold, respectively, to determine the existence of interference in the target subcarriers based on the comparison results. The predefined threshold is associated with a minimum distance between two constellation points of a modulation constellation of the target subcarriers.

From the foregoing, since error power reflects the degree of influence on a target subcarrier by interference, whether the target subcarrier encounters any interference or not may be determined by comparing the error power with the predefined threshold. In some embodiments, when a mean error power exceeds the predefined threshold, it is determined that interference exists in the target subcarrier, otherwise it is determined that no interference exists in the target subcarrier.

Figure 3:
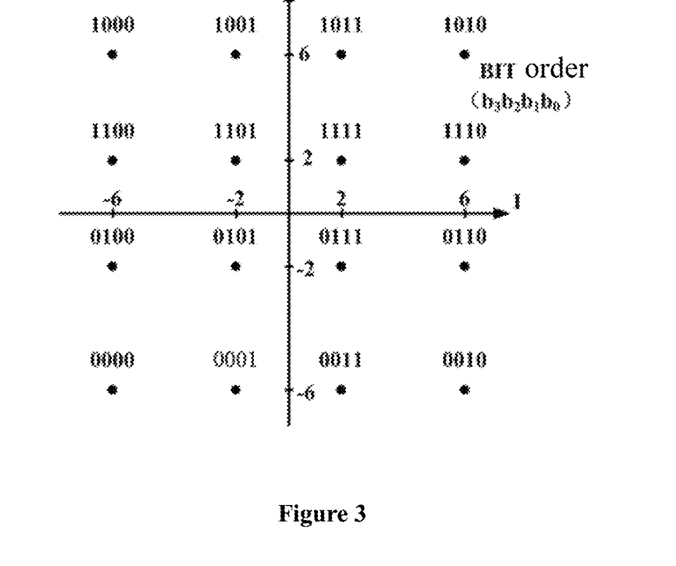
FIG. 3 illustrates a constellation diagram with subcarrier modulation symbols of 16QAM.

The predefined threshold may be determined by practical requirements. In some embodiments, the predefined threshold is set to be proportional to a minimum distance $D_{min}$ between two constellation points of a modulation constellation of the target subcarrier, i.e., $\gamma D_{min}^2$, where $\gamma$ is a scaling factor. $\gamma$ may be selected as a real number greater than 0.25. The smaller $\gamma$ is, the higher the detection probability is, i.e., the higher probability that interference is detected existing in the target subcarrier, and the higher the false accept rate is. On the contrary, the larger $\gamma$ is, the smaller the detection probability is, i.e., the lower probability that interference is detected existing in the target subcarrier, and the lower the false accept rate is. The false accept rate and the detection probability can be balanced by selecting a value of $\gamma$ properly. Preferably, the value of $\gamma$ may be selected as a real number ranging from 0.25 to 1.0, for example, 0.25, 0.5, 0.71 and 1. FIG. 3 illustrates a constellation diagram of subcarrier modulation symbols modulated in 16QAM as an example. As shown in FIG. 3, the minimum distance between two constellation points is Dmin=4. Thus, the predefined threshold may be set as $\gamma D_{min}^2 = 16\gamma$ and a specific value of the predefined threshold may be determined based on an actual value of $\gamma$.

In some embodiments, the error power(s) of the equalized target subcarrier(s) at step S107 may be a mean error power obtained by filtering the error power of the equalized target subcarrier(s) in time domain. The filtering process is used to reduce estimated variance and improve accuracy in the mean error power estimation.

Specifically, the error powers of the equalized subcarriers of different multicarrier modulation symbols having the same frequency as the equalized target subcarriers may be averaged to reduce the estimated variance.

In some embodiments, the mean error power may be calculated by averaging the error powers of the equalized subcarriers of different multicarrier modulation symbols, for example, adjacent multicarrier modulation symbols, having the same frequency as the equalized target subcarriers. In particular, if the sequence number of a multicarrier modulation symbol at a specific time is denoted as n, and the error power of the k-th equalized subcarriers of N adjacent multicarrier modulation symbols is denoted as Pk(n−N+1), Pk(n−N+2), . . . , Pk(n), respectively, then the estimated mean error power at that time may be represented as $$\overline{P}k(n) = \frac{1}{N} \sum_{m=n-N+1}^{n} Pk(m) = \overline{P}k(n-1) + [Pk(n) - Pk(n-N+1)]/N \quad (1)$$

where the multicarrier modulation symbol corresponding to the sequence number n is a last received symbol of the N multicarrier modulation symbols.

In some embodiments, the mean error power may also be obtained by smoothing the error powers of the equalized subcarriers of different multicarrier modulation symbols in time domain. Common smoothing algorithms include one order infinite impulse response (IIR) filtering, for example. Similarly, if the sequence number of a multicarrier modulation symbol corresponding to a current time is denoted as n, and the sequence number of a multicarrier modulation symbol corresponding to a previous time is denoted as n−1, then the one order IIR filtering may be represented as $$\overline{P}k(n) = (1-\alpha)\overline{P}k(n-1) + \alpha Pk(n) \quad (2)$$

where $\overline{P}k(n)$ denotes the mean error power of the k-th equalized subcarrier of the n-th multicarrier modulation symbol, Pk(n) denotes the error power of the k-th equalized subcarrier of the n-th multicarrier modulation symbol, and $\alpha$ denotes a smoothing factor and $0<\alpha<1$.

It should be noted that, notations $\overline{P}k(n)$ and Pk(n) are used to denote the mean error power and the error power of the k-th equalized subcarrier of the n-th multicarrier modulation symbol respectively in the above embodiments. In circumstances without indicating time moments specifically, the parameter n that denotes time moment may be omitted, and $\overline{P}k(n)$ and Pk(n) are denoted as $\overline{P}k$ and Pk, respectively.

It should also be noted that, in some alternative embodiments, the (unfiltered) error power(s) of the equalized target subcarrier(s) may also be compared with the predefined threshold, respectively, to determine the existence of an interference in the target subcarrier. Since it is only required to obtain the error power of the target subcarrier currently being detected, and the error powers of the equalized subcarriers of different multicarrier modulation symbols having the same frequency as the equalized target subcarriers are not required, such method is simple and the data processing speed of such method is faster.

The interference processing method 100 may be used to detect which subcarrier(s) of the multicarrier modulated signal encounter interference. Optionally, when it is detected that an interference signal exists, the method 100 may also be used to determine interference power of the interference signal. Enhanced processing on such information may be used by the receivers to improve the performance of the receivers. For example, information bits carried by the subcarrier that encounters interference may be assigned a relatively low confidence level or a relatively low weighting factor. In this way, the disturbed subcarriers and the undisturbed subcarriers are processed distinguishingly to improve the decoding performance. Moreover, the performance of the receiver may be improved simply by discarding the disturbed subcarriers. In addition, information about the subcarriers disturbed by interference may be fed back by the receiver to the transmitter side for circumventing the disturbed subcarriers. For example, the transmitter may transmit information on subcarriers other than the disturbed subcarriers, or transmit low-ordered modulation symbols on the disturbed subcarriers.

Figure 4:
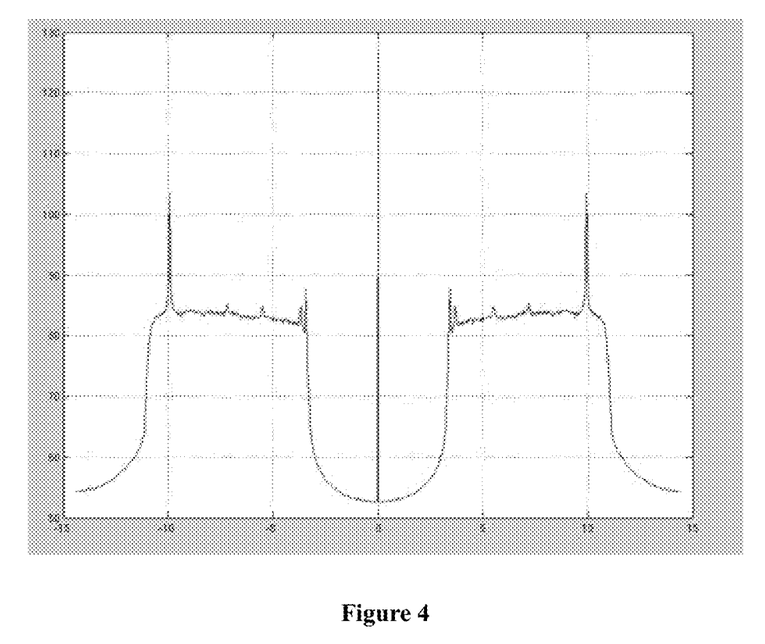
FIG. 4 illustrates a frequency domain waveform of a digital TV signal disturbed by interference.

FIG. 4 illustrates a frequency domain waveform of a digital TV signal disturbed by interference. As shown in FIG. 4, a horizontal axis represents frequency (MHz), and a vertical axis represents amplitude (dB). The modulation type of the digital TV signal is OFDM. The bandwidth of the signal is 8 MHz. The center frequency is 7.2 MHz. The digital TV signal includes 3780 desired subcarriers which carry data or pilot signals. As shown in FIG. 4, there are burrs at certain frequency points, which indicate that interference exists in proximity of the corresponding frequency points. For example, there are 20 dB burrs at a +10 MHz frequency point and a −10 MHz frequency point.

The signal shown in FIG. 4 will be taken as an example to further illustrate the operation of the interference processing method 100 illustrated in FIG. 2.

First, at step S101, an OFDM signal is received.

At step S103, the received OFDM signal is decomposed into 3780 subcarriers using a DFT with a size of 3780. In this example, all of the 3780 subcarriers are desired subcarriers. Therefore, the total number of the target subcarriers is 3780.

At step S105, the above target subcarriers are equalized to obtain equalized target subcarriers.

Figure 5:
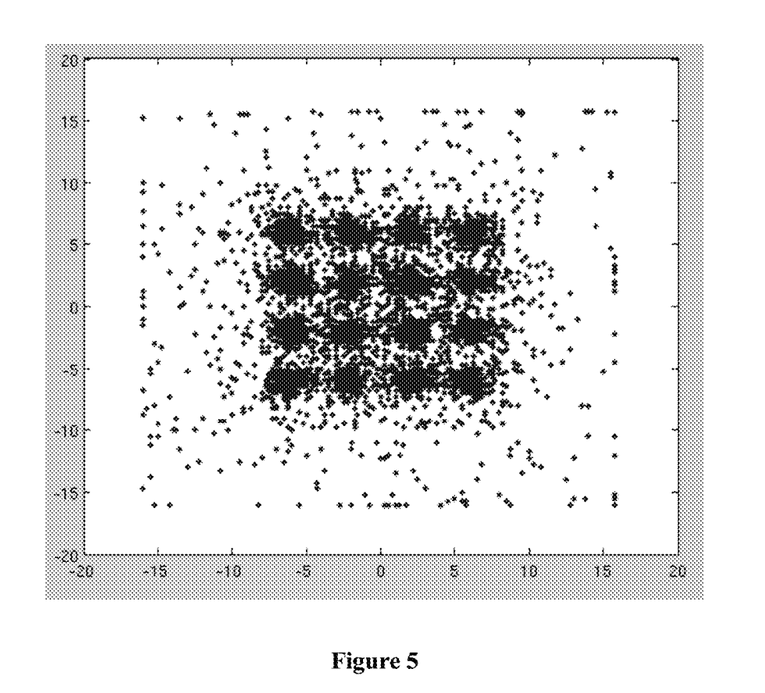
FIG. 5 illustrates a constellation diagram of an equalized target subcarrier.

FIG. 5 illustrates the constellation of the equalized target subcarriers. For convenience of observation, FIG. 5 shows all of the equalized target subcarriers of the OFDM symbols. It can be seen from FIG. 5 that, due to the existence of interference and noises, there are significant differences between the constellation of the equalized target subcarriers and the ideal constellation shown in FIG. 3.

At step S107 the mean error power of the equalized target subcarriers is obtained.

Figure 6:
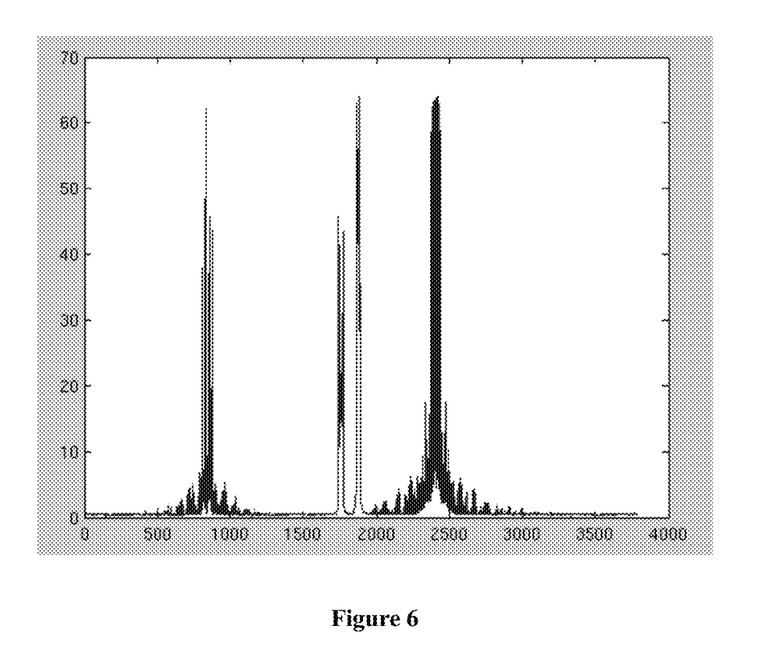
FIG. 6 illustrates mean error power of equalized target subcarriers calculated by a first order infinite impulse response (IIR) filtering equation.

FIG. 6 illustrates exemplary mean error powers of equalized target subcarriers calculated by the first order infinite impulse response (IIR) filtering equation (2). A horizontal axis represents subcarrier index and a vertical axis represents mean error power. As shown in FIG. 6, the mean error powers in certain frequency range (e.g., in the proximity of subcarriers with index 800 and 2400) is much higher than those of other subcarriers. The subcarriers with the relatively high mean error powers correspond to the exact disturbed subcarriers. It can be seen that, which subcarriers are disturbed can be determined based on the mean error power.

Accordingly, at step S109, the mean error powers of the equalized target subcarriers are compared with the predefined threshold, respectively. Based on the comparison result, it can be determined whether the target subcarriers encounter interference. For example, the predefined threshold can be set as $\gamma D_{min}^2 = 16\gamma$, where $\gamma$ is set to 1, and specifically the predefined threshold is equal to 16. Correspondingly, when the mean error power exceeds 16, it can be determined that the corresponding target subcarriers encounters interference. In the example shown in FIG. 6, subcarriers at frequencies of 800, 900, 1800 and 1900 and frequencies between 2350 and 2450 MHz encounter interference.

Figure 7:
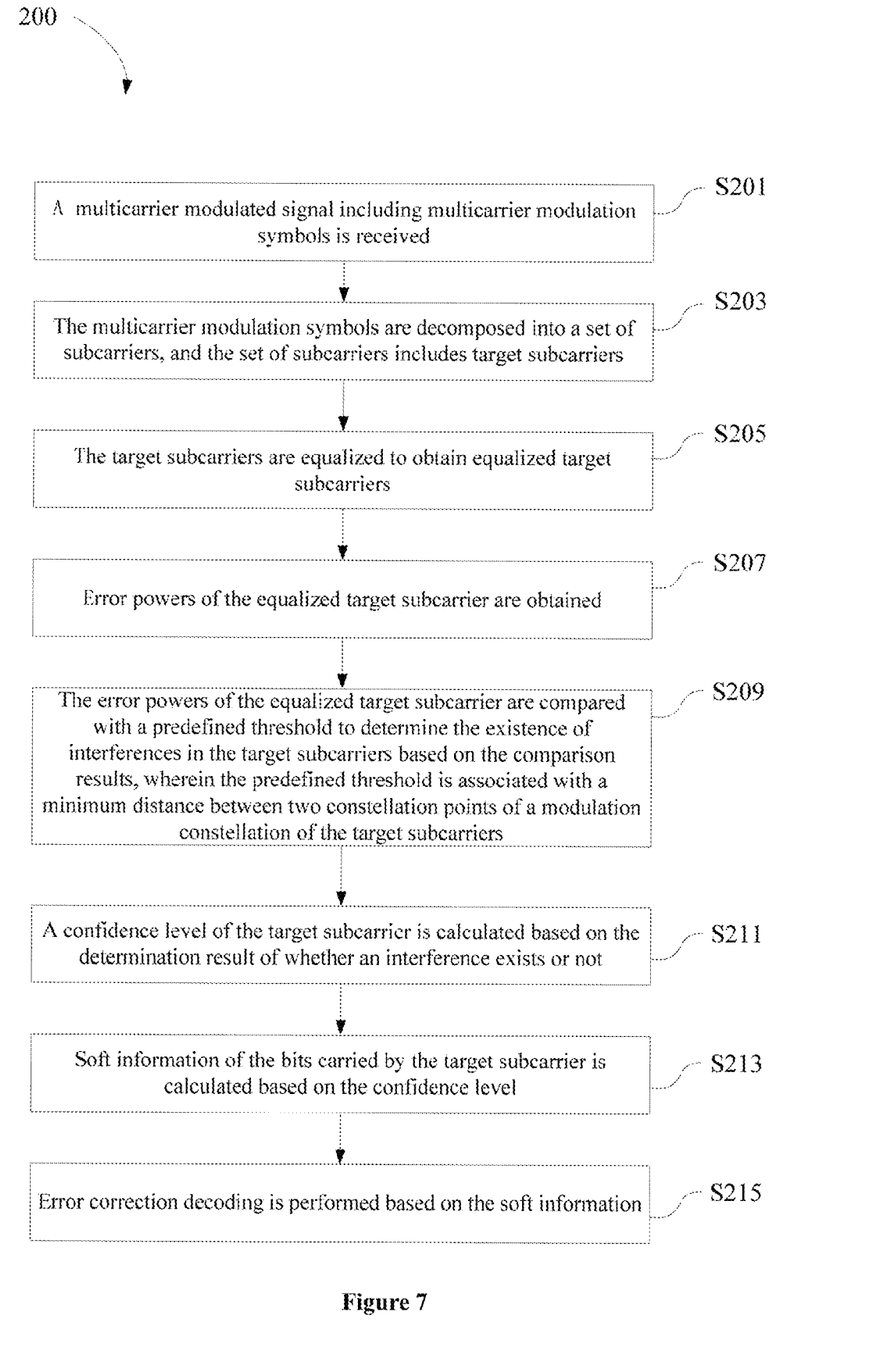
FIG. 7 illustrates an interference processing method 200 according to an embodiment of the application.

As described above, when it is determined that interference exists, the receiver may further process the subcarriers that encounter the interference, to mitigate the impact of the interference to subsequent data processing. FIG. 7 illustrates an interference processing method 200 according to an embodiment of the application. The method 200 may be used to mitigate interference in a multi-carrier modulated signal. As shown in FIG. 7, the method 200 includes the following steps.

At step S201, a multi-carrier modulated signal is received, wherein the multi-carrier modulated signal has multi-carrier modulation symbols.

At step S203, the multi-carrier modulation symbols are decomposed into a set of subcarriers, wherein the set of subcarriers comprises one or more target subcarriers.

At step S205, the one or more target subcarriers are equalized to obtain one or more equalized target subcarriers.

At step S207, error powers of the equalized target subcarriers are obtained.

At step S209, the error powers of the equalized target subcarriers are compared with a predefined threshold to determine the existence of interference in the target subcarriers, wherein the predefined threshold is associated with a minimum distance between two constellation points of a modulation constellation of the target subcarriers.

The above steps S201 to S209 may be performed in a manner similar to steps S101 to S109 shown in FIG. 2. Specific implementation method may be referred to steps S101 to S109 and thus will be omitted here.

After the steps of determining the existence of interference in the target subcarriers, the method 200 further includes step S211. At step S211, a confidence level of the target subcarriers is calculated based on the determination result of the existence of interference.

Specifically, the confidence level is used to measure a degree of accuracy of the equalized subcarriers, or a degree of closeness to the ideal value. It can be appreciated that the subcarriers that encounter interference may be assigned a relatively low confidence level, and on the contrary, the subcarriers that do not encounter interference may be assigned a relatively high confidence level.

In some embodiments, when it is detected that interference exists in a target subcarrier, the confidence level of the target subcarrier may be calculated as a reciprocal of the error power of the equalized target subcarrier. For example, assuming that the mean error power of the k-th subcarrier calculated in step S207 is $\bar{P}k$, when it is detected that interference exists in the target subcarrier, the confidence level Ck of the target subcarrier may be calculated as $$Ck = 1/\sqrt{\bar{P}k} \qquad (3)$$

In some embodiments, when it is detected that interference exists in a target subcarrier, the confidence level of the target subcarrier may be calculated as a result obtained by multiplying square of modulus of a channel response of the target subcarrier with an adjusting factor and then dividing the product by the error power of the equalized target subcarrier. For example, assuming that the mean error power of the k-th subcarrier calculated in step S207 is $\bar{P}k$, and the channel response information is $\hat{H}k$, when it is detected that interference exists in the target subcarrier, the confidence level Ck of the target subcarrier may be calculated as $$Ck = \eta |\hat{H}k|^2 / \bar{P}k \qquad (4)$$

where η denotes the adjusting factor which may be set to a real number ranging from 0.1 to 1.

In some embodiments, when it is detected that interference exists in a target subcarrier, the confidence level of the target subcarrier may be calculated as a product of a mean square of moduli of channel responses of a plurality of subcarriers of the set of subcarriers and an adjusting factor divided by the error power of the equalized target subcarrier. Accordingly, the confidence level Ck of the target subcarrier may be calculated as $$Ck = \eta \overline{|H|^2} / \bar{P}k \qquad (5)$$

where $\overline{|H|^2}$ denotes the mean square of moduli of channel responses of a plurality of subcarriers of the set of subcarriers, i.e., $$\overline{|H|^2} = \sum_{i=k}^{k-1+N_{avg}} |\hat{H}i|^2 / N_{avg} \qquad (6)$$

where $\hat{H}i$ denotes a channel response of the i-th subcarrier, $N_{avg}$ denotes the number of subcarriers used in calculation of the mean square of moduli of channel responses. It should be noted that, the mean value $\overline{|H|^2}$ calculated in the above equation (6) using the k-th to k−1+$N_{avg}$ subcarriers is exemplary only. It can be appreciated for a person skilled in the art that other subcarriers may be used to calculate the mean value. In some embodiments, all of the subcarriers may be used to calculate the mean value $\overline{|H|^2}$, in other words, $N_{avg}$ may be equal to the number of all the target subcarriers.

In some embodiments, when it is detected that no interference exists in the target subcarrier, the confidence level Ck of the subcarrier carrier may be calculated as $$Ck = |\hat{H}k|^2 / \sigma^2 \qquad (7)$$

It should be noted that, the channel response may be obtained by any channel estimation methods. For example, in some systems, a pseudo-random signal with good auto-correlation characteristic is transmitted by a transmitter. The pseudo-random signal is known to the receiver or may be known by the receiver in other ways. After receiving the pseudo-random signal, the receiver correlates the pseudo-random signal with a local pseudo-random sequence to obtain the channel response. Optionally, after the noise of channel response is reduced and the channel response is transformed into frequency domain, channel responses at all the subcarriers can be obtained. In some systems, pilot signals may be transmitted by a transmitter on certain pilot subcarriers. The modulation symbols carried by the pilot subcarriers are known to the receiver. By comparing each of the received pilot subcarrier and the respective modulation symbols carried by the pilot subcarrier, the receiver may obtain the channel responses on the pilot subcarriers. Channel responses of other non-pilot subcarriers may be obtained by interpolation based on the channel responses on the pilot subcarriers.

The noise power is the power of noise obtained by the receiver using a noise estimation method. It can be appreciated by a person skilled in the art that various noise estimation methods may be used to estimate the noise power. For example, a channel response may be first estimated by the receiver based on a received pseudo-random signal transmitted by the transmitter. Then the channel response may be convolved with the local pseudo-random signal to obtain a reconstructed received signal. After that, an error signal may be obtained by calculating a difference between the reconstructed signal and the received pseudo-random signal to obtain the error signal. Finally, the noise power may be estimated by averaging the squared module of the error signal.

At step S213, soft information of the bits carried by the target subcarriers is calculated based on the confidence level.

It can be appreciated by a person skilled in the art that, the soft information of a bit is also called a soft bit. The soft information of a bit reflects a probability of whether the bit carried by the subcarrier received by the receiver equals to 0 or 1, which is generally referred to as likelihood ratio (LR) or log-likelihood ratio (LLR). Here, the likelihood ratio refers to the ratio between a probability that the bit equals to 0 and another probability that the bit equals to 1. The log-likelihood ratio is the logarithm of the likelihood ratio. According to the definition of LLR, the more undeterminable the received bit is, the larger the absolute value of LLR is, and otherwise, the smaller the absolute value of LLR is. If the probability that the received bit is decided to be 0 equals to the probability that the received bit is decided to be 1, then LLR=0, which corresponds to the case that the received bit is the most undeterminable.

Based on the confidence level of the subcarriers, the soft information of the bits carried by the subcarriers may be further obtained. Since calculation of soft information is relevant to specific modulation pattern, in the following context, the method for calculating the soft information of bits based on the confidence level is illustrated by taking QPSK modulation as an example. The methods for other modulation modes are similar.

Figure 8:
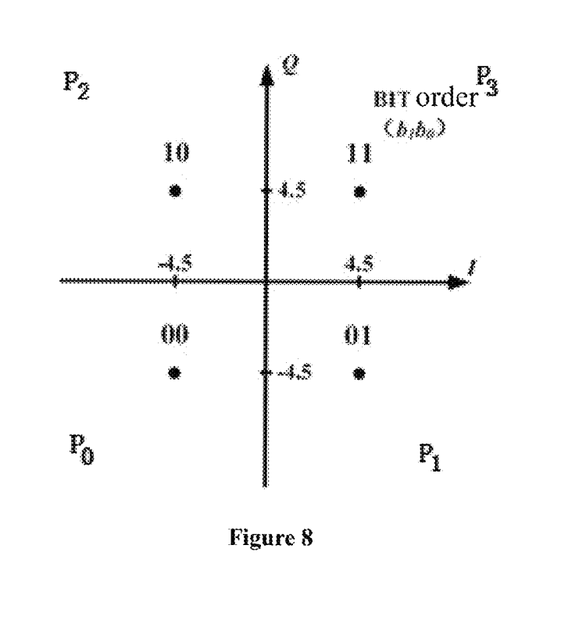
FIG. 8 illustrates a constellation diagram of QPSK.

As shown in FIG. 8, there are totally 4 constellation points in the QPSK constellation. Each constellation point corresponds to a different combination of two transmission bits $b_1 b_0$. The transmitter selects one of the 4 constellation points as the modulation symbols on the k-th subcarrier. For illustration purpose, the constellation points corresponding to $b_1 b_0$=00, 01, 10 and 11 are represented as $s_0$, $s_1$, $s_2$ and $s_3$, respectively. Due to the disturbance of noises, interference and other factors, the receiver may not be able to determine which exact constellation points is transmitted. However, the receiver may estimate a posteriori probability of each constellation point based on the equalized subcarrier Xk. As shown in FIG. 8, $p_0$, $p_1$, $p_2$ and $p_3$ denote the probability of each constellation point which may be represented as $p_i$=P($s_i$|Xk), i=0, 1, 2, 3, respectively. Based on the embodiments of the application, the above probability may be represented by the following equation $$p_i = \frac{1}{\sqrt{2\pi \cdot Ck}} e^{-\frac{|Xk - s_i|^2}{2Ck}} \qquad (8)$$

where Ck is the confidence level of the k-th target subcarrier calculated at step S211. It can be seen from the above equation that, when the subcarrier Xk and the constellation point $s_i$ are given, the higher the confidence level is, the higher the probability is. It should be noted that, it is not necessary to calculate the final result of the probability, and instead LLRs of various bits can be calculated based on the above equation. Here, the LLR of bit $b_1$ may be represented as $$LLR(b_1) = lg\frac{P(b_1 = 0 \mid Xk)}{P(b_1 = 1 \mid Xk)} = lg\frac{p_0 + p_1}{p_2 + p_3} \qquad (9)$$

The LLR of bit $b_0$ may be represented as $$LLR(b_0) = lg\frac{P(b_0 = 0 \mid Xk)}{P(b_0 = 1 \mid Xk)} = lg\frac{p_0 + p_2}{p_1 + p_3} \qquad (10)$$

It can be appreciated by a person skilled in the art that the above equations for calculating LLRs of bits $b_1$ and $b_0$ are exemplary only, further approximations may be made on the above equations to obtain simple methods.

Still further, at step S215, error correction decoding is performed based on the soft information.

Based on the soft information of the bits carried by all the target subcarriers, the decoder may perform an error correction decoding. It should be noted that, the error correction decoding herein should be interpreted broadly, which includes not only the decoding of forward error correction (FEC) codes but also operations such as de-interleaving of the soft bits. The FEC may be any channel coding scheme such as convolutional codes, Turbo codes, low density parity check (LDPC) codes, etc.

It can be appreciated by a person skilled in the art that, bits carried by the target subcarriers belong to a part of the FEC code blocks (abbr. as code blocks). A code block is generally processed by an encoder or a decoder as a whole. In order to obtain a relatively large diversity gain, the transmitter generally distributes the bits in a code block into a plurality of subcarriers of one or more multi-carrier modulated symbols. Accordingly, before performing the error correction decoding, the receiver needs to collect the soft information of the bits belonging to the same code block carried by the corresponding subcarriers of one or more multi-carrier modulated symbols.

Based on the interference processing method 200 according to the embodiments of the application, LLRs of the bits carried by the undisturbed carriers are calculated based on the noise power, and LLRs of the bits carried by the disturbed carriers are calculated based on the mean error power of the corresponding equalized subcarriers. Thus, by processing the disturbed subcarriers and the undisturbed subcarriers differently, and assigning a relatively low confidence level to the disturbed subcarriers, the LLRs of the bits carried by the disturbed subcarriers can be reduced, so that the performance of the FEC decoding is improved and the interference can be suppressed.

Figure 9:
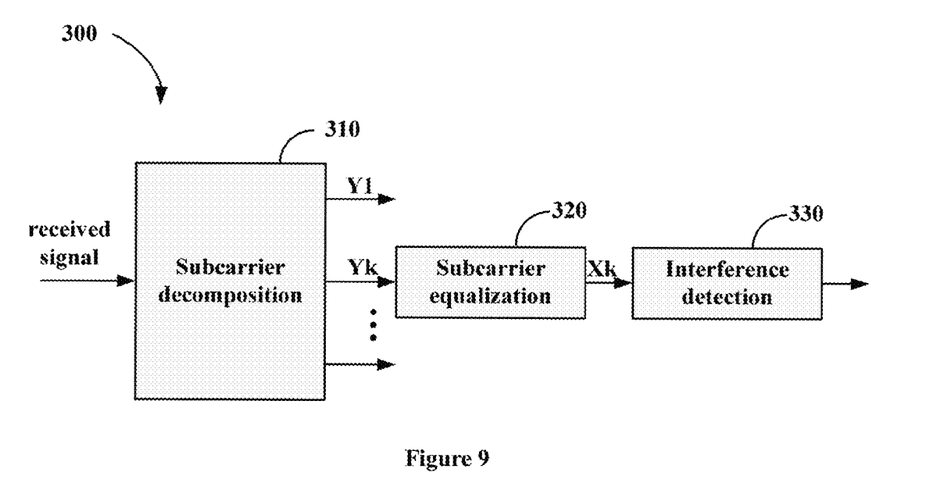
FIG. 9 illustrates a receiver 300 with an interference processing apparatus according to an embodiment of the application.

FIG. 9 illustrates a diagram of a receiver 300 with an interference processing apparatus according to an embodiment of the application. The receiver 300 may be used for receiving multi-carrier signals to carry out the interference processing method 100 illustrated in FIG. 2. The receiver 300 may be used to detect which subcarrier of a multi-carrier modulated signal encounters interference. Optionally, if interference exists, the receiver 300 may also determine the power of the detected interference.

As shown in FIG. 9, the receiver 300 includes a subcarrier discomposing module 310 for receiving a multicarrier modulated signal comprising multicarrier modulation symbols and decomposing the multicarrier modulation symbols into a set of subcarriers, wherein the set of subcarriers at least comprises a target subcarrier. The receiver 300 further includes a subcarrier equalization module 320 for equalizing the target subcarrier to obtain an equalized target subcarrier, and an interference detection module 330 for obtaining an error power of the equalized target subcarrier.

Figure 10:
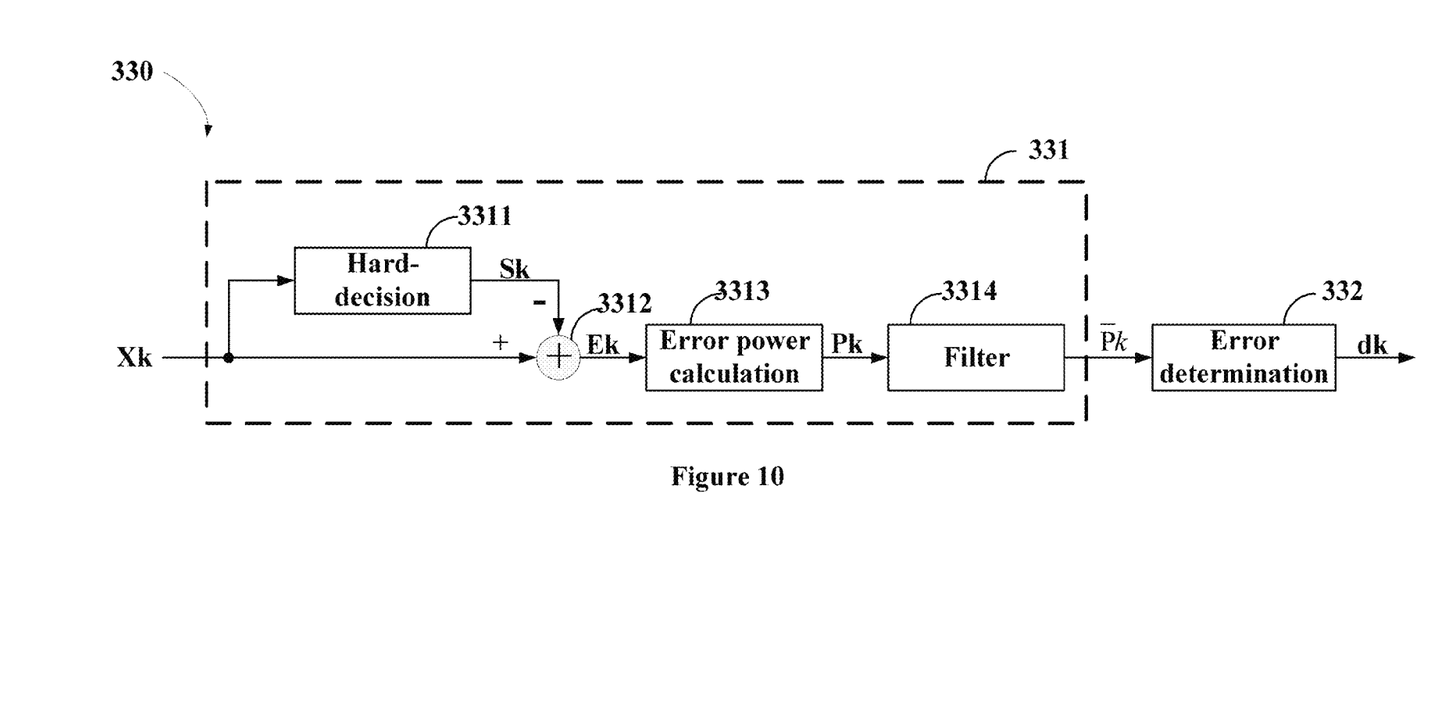
FIG. 10 illustrates an example of the interference processing module 330 shown in FIG. 9.

FIG. 10 illustrates an example of the interference mitigating module 330 shown in FIG. 9.

As shown in FIG. 10, the interference detection module 330 includes an error power obtaining module 331 and an interference determining module 332. The error power obtaining module 331 is used for obtaining the mean error power $\overline{P}k$ of the equalized target subcarrier Xk, the error determining module 332 is used for comparing the mean error power $\overline{P}k$ with a predefined threshold and determining the existence of interference in the target subcarrier based on the comparison result of the mean error power $\overline{P}k$ and the predefined threshold.

In some embodiments, as shown in FIG. 10, the error power obtaining module 331 includes a hard-decision unit 3311, an error calculation unit 3312, and error power calculation unit 3313 and a filtering unit 3314.

The hard-decision unit 3311 is used for hard-deciding the equalized target subcarrier Xk to obtain the hard-decision result Sk. Here, the hard decision means the process of comparing the distances between the target subcarrier Xk and each constellation point of the signal modulated by the target subcarrier and selecting the constellation point with a minimum distance as the hard-decision result Sk.

The error calculation unit 3312 is used to calculate an error Ek of the equalized target subcarrier Xk. The error Ek is a difference between the equalized target subcarrier Xk and the hard-decision result Sk, i.e., Ek=Xk−Sk.

The error power calculation unit 3313 is used to calculate an error power Pk of the equalized target subcarrier Xk. The error power Pk is equal to a squared modulus of the error Ek, i.e., Pk=|Ek|$^2$.

The filtering unit 3314 is used for filtering the error power of the equalized target subcarrier to obtain a mean error power $\overline{P}k$ of the equalized target subcarrier Xk. In some embodiments, the target subcarrier can be one or more subcarriers of all or a portion of a set of multi-carrier modulation symbols. The filtering unit 3314 is configured to filter the error power of the equalized target subcarrier of the set of multi-carrier modulation symbols having the same frequency as the equalized target subcarrier, to obtain the mean error power of the equalized target subcarrier. In other embodiments, the target subcarrier can be one or more subcarriers of all or a portion of a set of multi-carrier modulation symbols. The filtering unit 3314 is configured to smooth the error power of the equalized target subcarrier of the set of multi-carrier modulation symbols having the same frequency as the equalized target subcarrier to obtain the mean error power of the equalized target subcarrier.

In some embodiments, the interference determining module 332 compares the mean error power $\overline{P}k$ with a predefined threshold. When the mean error power $\overline{P}k$ is greater than the predefined threshold, it is determined that the subcarrier encounters interference. Otherwise, it is determined that the subcarrier does not encounter any interference. In some embodiments, the predefined threshold is associated with a minimum distance between two constellation points of a modulation constellation of the target subcarrier. In some embodiments, the predefined threshold is set proportional to a square of the minimum distance Dmin between two constellation points of the modulation constellation of the target subcarrier, i.e., $\gamma D_{min}^2$, wherein $\gamma$ is a scaling factor which may be selected as a real number greater than 0.25, for example, from 0.25 to 1.

Figure 11:
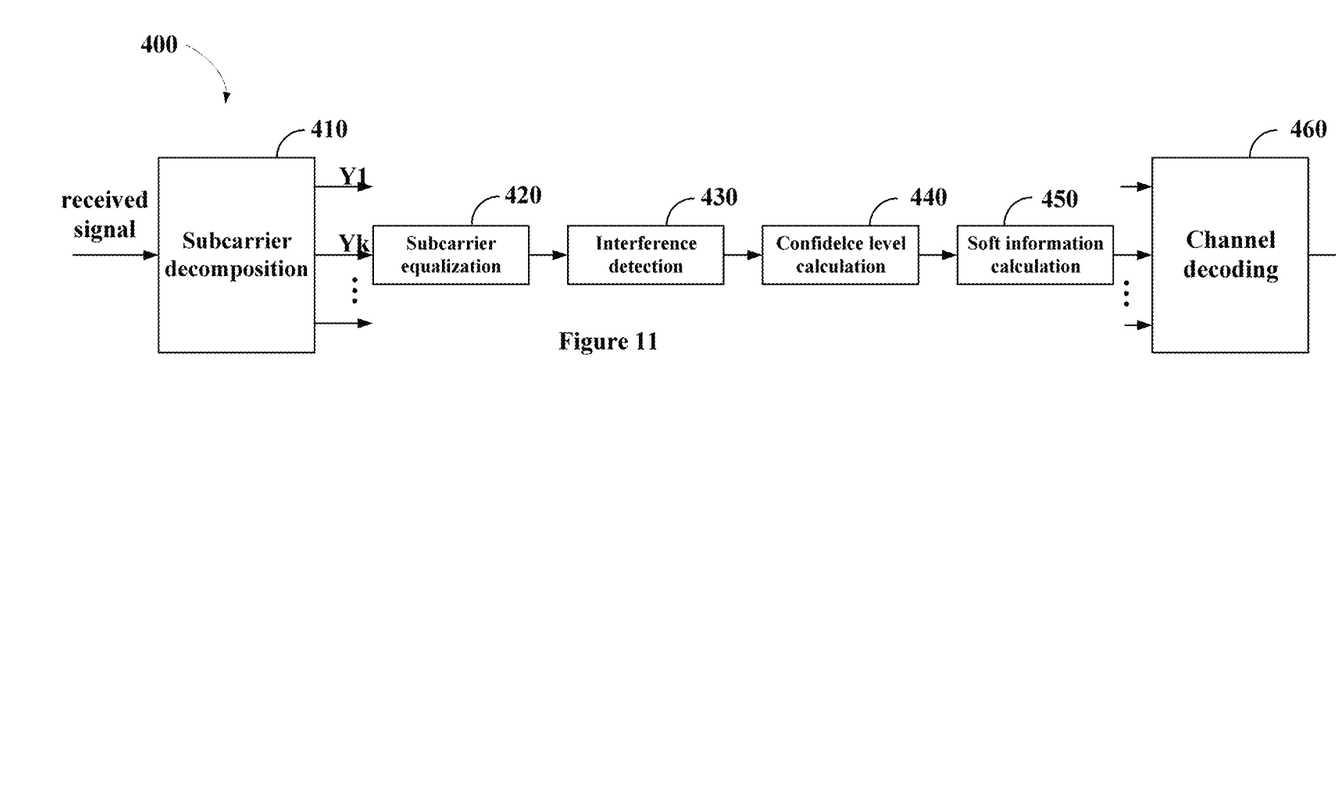
FIG. 11 illustrates a multi-carrier modulation signal receiver 400 with an interference processing apparatus according to an embodiment of the application.

FIG. 11 illustrates a multi-carrier modulation signal receiver 400 with an interference processing apparatus according to an embodiment of the application. The receiver 400 receives a multi-carrier modulated signal, which may be used for implementing the interference processing method 200 illustrated in FIG. 7.

As shown in FIG. 11, the receiver 400 includes a subcarrier decomposing module 410, a subcarrier equalization module 420, an interference detection module 430, a confidence level calculation module 440, a soft information calculation module 450 and a channel decoding module 460.

The subcarrier decomposing module 410 is used to decompose the multicarrier modulation symbols into a plurality of subcarriers, wherein the plurality of subcarriers at least comprises a target subcarrier.

The subcarrier equalization module 420 is used to equalize the target subcarrier to obtain an equalized target subcarrier.

The interference detection module 430 is used to detect the existence of interference in the target subcarrier.

The confidence level calculation module 440 calculates a confidence level of the target subcarrier based on the determination result of the existence of interference.

In some embodiments, the confidence level calculation module 440 includes a selection unit, a first confidence calculation unit and a second confidence calculation unit.

The first confidence calculation unit calculates the confidence level of the equalized target subcarrier according to equation (7) based on channel responses and the noise power of the target subcarrier.

The second confidence calculation unit calculates the confidence level of the equalized target subcarrier according to equation (3) based on the mean error power of the target subcarrier.

The selection unit is used to select one of the two confidence level calculation units to calculate the confidence level of the target subcarrier. When it is detected that no interference exists in the target subcarrier, the first confidence level detection unit is selected. When it is detected that interference exists in the target subcarrier, the second confidence level detection unit is selected.

In some embodiments, the second confidence level unit may calculate the confidence level of the equalized target subcarrier according to equation (4) or equation (5) based on channel responses of one or more subcarriers, and a mean error power of the equalized target subcarrier and an adjusting factor.

The soft information calculation module 450 determines soft information of bits carried by the target subcarrier based on the confidence level.

The channel decoding module 460 receives the soft information of various target subcarriers and performs decoding using a corresponding error correction decoding method.

Detailed implementation of the modules described above may be referenced to the corresponding method embodiments and will be omitted here.

It can be appreciated that the receiver 400 shown in FIG. 11 only illustrates some of the modules therein exemplarily. In applications, the receiver 400 may also include other modules, such as an RF module, a synchronization module, a channel estimation module, a noise estimation module and the like.

Those skilled in the art may understand and implement other variations to the disclosed embodiments from a study of the drawings, the disclosure, and the appended claims. In the claims, the word "comprising" does not exclude other elements or steps, and the indefinite article "a" or "an" does not exclude a plurality. In applications according to present application, one element may perform functions of several technical features recited in claims. Any reference signs in the claims should not be construed as limiting the scope. The scope and spirit of the present application are defined by the appended claims.

What is claimed is:

1. An interference processing method, comprising:
   receiving a multi-carrier modulated signal, wherein the multi-carrier modulated signal comprises multi-carrier modulation symbols;
   discomposing the multi-carrier modulation symbols into a set of subcarriers, wherein the set of subcarriers at least comprises a target subcarrier;
   equalizing the target subcarrier to obtain an equalized target subcarrier;
   obtaining an error power of the equalized target subcarrier; and
   comparing the error power of the equalized target subcarrier with a predefined threshold to determine an existence of interference in the target subcarrier, wherein the predefined threshold is associated with a minimum distance between two constellation points of a modulation constellation of the target subcarrier.

2. The method of claim 1, wherein comparing the error power of the equalized target subcarrier with the predefined threshold to determine the existence of interference in the target subcarrier comprises:
   determining that interference exists in the target subcarrier if the error power is greater than the predefined threshold.

3. The method of claim 1, wherein the predefined threshold is equal to $\gamma$ times of a square of the minimum distance between two constellation points of the modulation constellation of the target subcarrier, and wherein $\gamma$ ranges from 0.25 to 1.

4. The method of claim 1, wherein the error power of the equalized target subcarrier is a mean error power of the equalized target subcarrier.

5. The method of claim 4, wherein obtaining the error power of the equalized target subcarrier comprises:
   calculating the error power of the equalized target subcarrier;
   filtering the error power of the equalized target subcarrier in time domain to obtain the mean error power of the equalized target subcarrier.

6. The method of claim 5, wherein calculating the error power of the equalized target subcarrier comprises:
   hard-deciding the equalized target subcarrier;
   determining the error power of the equalized target subcarrier based on a difference between the equalized target subcarrier and the hard-decided target subcarrier.

7. The method of claim 5, wherein the target subcarrier is one or more subcarriers obtained by discomposing all or a portion of a group of multicarrier modulation symbols, and the mean error power of the equalized target subcarrier is obtained by filtering the error powers of equalized subcarriers of the group of multicarrier modulation symbols having the same frequency as the equalized target subcarrier.

8. The method of claim 1, wherein the method is applied to an orthogonal frequency division multiplexing (OFDM) system, and the multicarrier modulation signal is an OFDM signal.

9. The method of claim 1, wherein the method further comprises:
calculating a confidence level of the target subcarrier based on the determination result of the existence of interference;
determining soft information of bits carried by the target subcarrier based on the confidence level; and
performing error correction decoding based on the determined soft information.

10. The method of claim 9, wherein calculating the confidence level of the target subcarrier based on the determination result of the existence of interference comprises:
calculating the confidence level of the target subcarrier as a reciprocal of the error power of the equalized target subcarrier when it is detected that interference exists in the target subcarrier.

11. The method of claim 9, wherein calculating the confidence level of the target subcarrier based on the determination result of the existence of interference comprises:
calculating the confidence level of the target subcarrier as a product of a squared modulus of a channel response of the target subcarrier and an adjusting factor divided by the error power of the equalized target subcarrier, when it is detected that interference exists in the target subcarrier, wherein the adjusting factor is a real number ranging from 0.1 to 1.

12. The method of claim 9, wherein calculating the confidence level of the target subcarrier based on the determination result of the existence of interference comprises:
calculating the confidence level of the target subcarrier as a product of a mean square of moduli of channel responses of a plurality of subcarriers of the set of subcarriers and an adjusting factor divided by the error power of the equalized target subcarrier, when it is detected that interference exists in the target subcarrier, wherein the adjusting factor is a real number ranging from 0.1 to 1.

13. The method of claim 9, wherein calculating the confidence level of the target subcarrier based on the determination result of whether interference exists comprises:
calculating the confidence level of the target subcarrier as a squared modulus of a channel response of the target subcarrier divided by a noise power when it is detected that no interference exists in the target subcarrier.

14. An interference processing apparatus, comprising:
a sub-carrier decomposition module configured to receive a multicarrier modulated signal comprising multicarrier modulation symbols, and to decompose the multicarrier modulation symbols into a set of subcarriers, wherein the set of subcarriers at least comprises a target subcarrier;
a subcarrier equalization module configured to equalize the target subcarrier to obtain an equalized target subcarrier;
an error power obtaining module configured to obtain an error power of the equalized target subcarrier; and
an interference determination module configured to determine an existence of interference in the target subcarrier by comparing the error power of the equalized target subcarrier with a predefined threshold, wherein the predefined threshold is associated with a minimum distance between two constellation points of a modulation constellation of the target subcarrier.

15. The apparatus of claim 14, wherein the interference determination module is further configured to determine that interference exists in the target subcarrier if the error power is greater than the predefined threshold.

16. The apparatus of claim 14, wherein the predefined threshold is equal to $\gamma$ times of a square of the minimum distance between two constellation points of the modulation constellation of the target subcarrier, wherein $\gamma$ ranges from 0.25 to 1.

17. The apparatus of claim 14, wherein the error power of the equalized target subcarrier is a mean error power of the equalized target subcarrier.

18. The apparatus of claim 14, wherein the error power obtaining module further comprises:
a hard-decision unit configured to hard-decide the equalized target subcarrier;
an error calculation unit configured to calculate an error of the equalized target subcarrier, wherein the error of the equalized target subcarrier is a difference between the equalized target subcarrier and the hard-decided target subcarrier; and
an error power calculation unit configured to calculate the error power of the equalized target subcarrier based on the error of the equalized target subcarrier.

19. The apparatus of claim 18, wherein the error power obtaining module further comprises:
a filtering unit configured to filter the error power of the equalized target subcarrier in time domain to obtain the mean error power of the equalized target subcarrier.

20. The apparatus of claim 19, wherein the target subcarrier is one or more subcarriers obtained by discomposing all or a portion of a group of multicarrier modulation symbols, and the filtering unit is configured to filter the error powers of equalized subcarriers of the group of multicarrier modulation symbols having the same frequency as the equalized target subcarrier to obtain the mean error power of the equalized target subcarrier.

21. The apparatus of claim 14, further comprising:
a confidence level calculation module configured to calculate a confidence level of the target subcarrier based on the determination result of the existence of interference;
a soft information calculation module configured to determine soft information of bits carried by the target subcarrier based on the confidence level; and
a channel decoding module configured to performing error correction decoding based on the soft information.

* * * * *